United States Patent
Liu

(10) Patent No.: US 9,721,711 B2
(45) Date of Patent: Aug. 1, 2017

(54) SWITCH STRUCTURE AND ELECTRONIC DEVICE EMPLOYING SAME

(71) Applicants: SHENZHEN FUTAIHONG PRECISION INDUSTRY CO., LTD., Shenzhen (CN); FIH (Hong Kong) Limited, Kowloon (HK)

(72) Inventor: Jun-Fang Liu, Shenzhen (CN)

(73) Assignees: SHENZHEN FUTAIHONG PRECISION INDUSTRY CO., LTD., Shenzhen (CN); FIH (HONG KONG) LIMITED, Kowloon (HK)

( * ) Notice: Subject to any disclaimer, the term of this patent is extended or adjusted under 35 U.S.C. 154(b) by 298 days.

(21) Appl. No.: 14/314,285

(22) Filed: Jun. 25, 2014

(65) Prior Publication Data

US 2015/0002979 A1    Jan. 1, 2015

(30) Foreign Application Priority Data

Jun. 28, 2013  (CN) .......................... 2013 1 0265238

(51) Int. Cl.
*H01F 7/06*  (2006.01)
*H01F 7/02*  (2006.01)
*H01F 7/04*  (2006.01)
*H04M 1/02*  (2006.01)

(52) U.S. Cl.
CPC ............. *H01F 7/0252* (2013.01); *H01F 7/04* (2013.01); *H04M 1/0249* (2013.01)

(58) Field of Classification Search
CPC ....... H01F 7/0252; H01F 7/04; H04M 1/0249
See application file for complete search history.

(56) References Cited

U.S. PATENT DOCUMENTS

| | | | |
|---|---|---|---|
| 2002/0022496 A1* | 2/2002 | Park ................... | H04M 1/0214 455/575.3 |
| 2008/0146295 A1* | 6/2008 | Jorgensen ............ | H01F 7/0263 455/575.3 |
| 2012/0119346 A1* | 5/2012 | Im ........................ | H01L 21/563 257/690 |

* cited by examiner

*Primary Examiner* — Thienvu Tran
*Assistant Examiner* — Tien Mai
(74) *Attorney, Agent, or Firm* — Steven Reiss

(57) ABSTRACT

A switch structure includes a power element, a keypad, a first magnetic component, and a second magnetic component. The second magnetic component is positioned adjacent to the first magnetic component. When the keypad is deactivated, a magnetic attractive force is generated between the first magnetic component and the second magnetic component. When the keypad is activated, the power element controls the first magnetic component to generate a magnetic repulsive force with the second magnetic component.

16 Claims, 7 Drawing Sheets

SWITCH STRUCTURE AND ELECTRONIC DEVICE EMPLOYING SAME

FIELD

The exemplary disclosure generally relates to switch structures, and particularly to a switch structure for opening a cover and an electronic device employing the switch structure.

BACKGROUND

A cover, such as a battery cover or a protective cover for a connector, of a portable electronic device is usually locked to a main body of the portable electronic device via a locking structure.

BRIEF DESCRIPTION OF THE DRAWINGS

Many aspects of the exemplary embodiments can be better understood with reference to the drawings. The components in the drawings are not necessarily drawn to scale, the emphasis instead being placed upon clearly illustrating the principles of the disclosure.

DETAILED DESCRIPTION

The disclosure is illustrated by way of example and not by way of limitation in the figures of the accompanying drawings in which like references indicate similar elements. It should be noted that references to "an" or "one" exemplary embodiment in this disclosure are not necessarily to the same exemplary embodiment, and such references mean "at least one". The references "a plurality of" and "a number of" mean "at least two."

Figure 1:
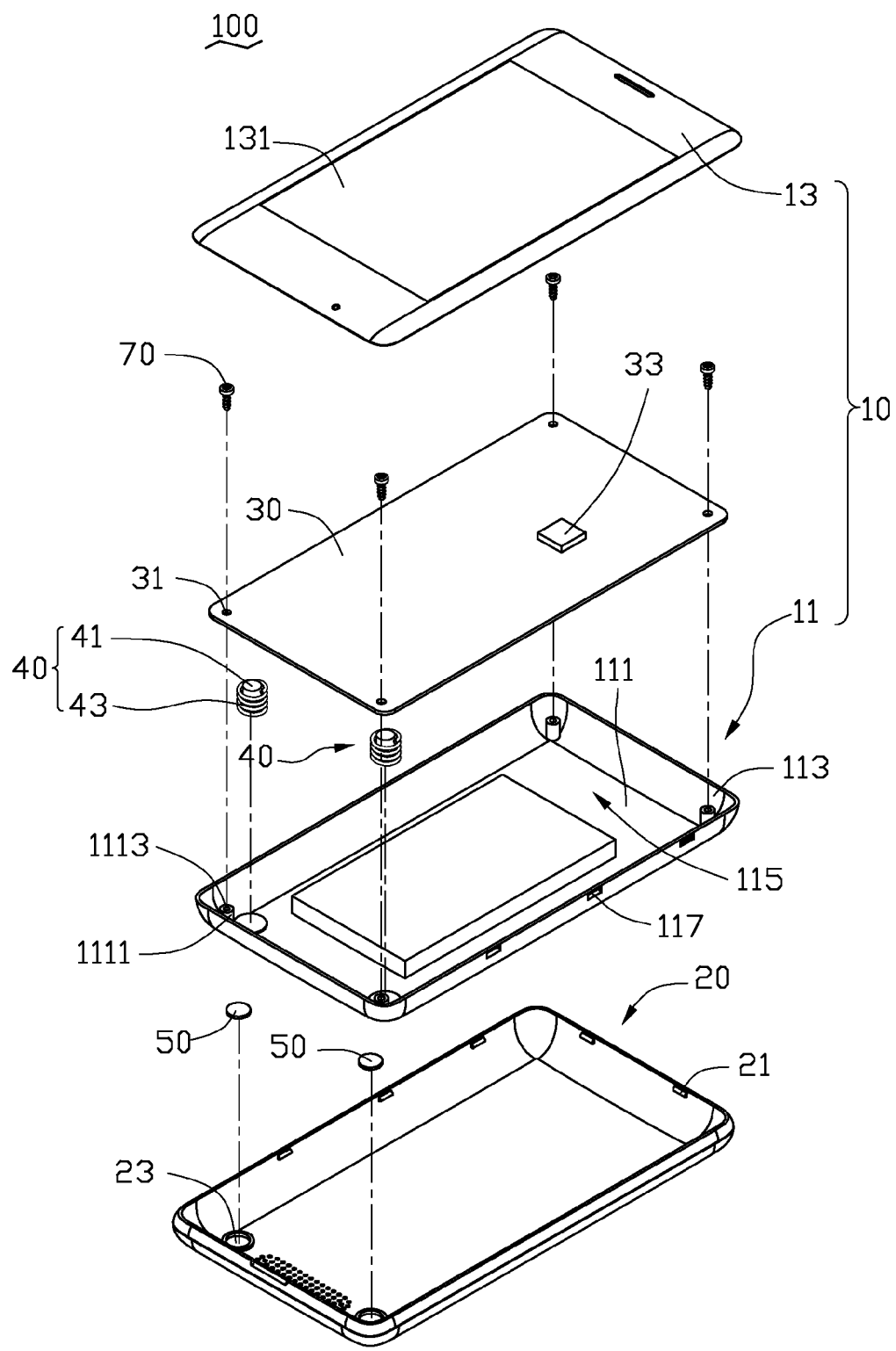
FIG. 1 shows an exploded view of a first exemplary embodiment of an electronic device employing a switch structure.
Figure 2:
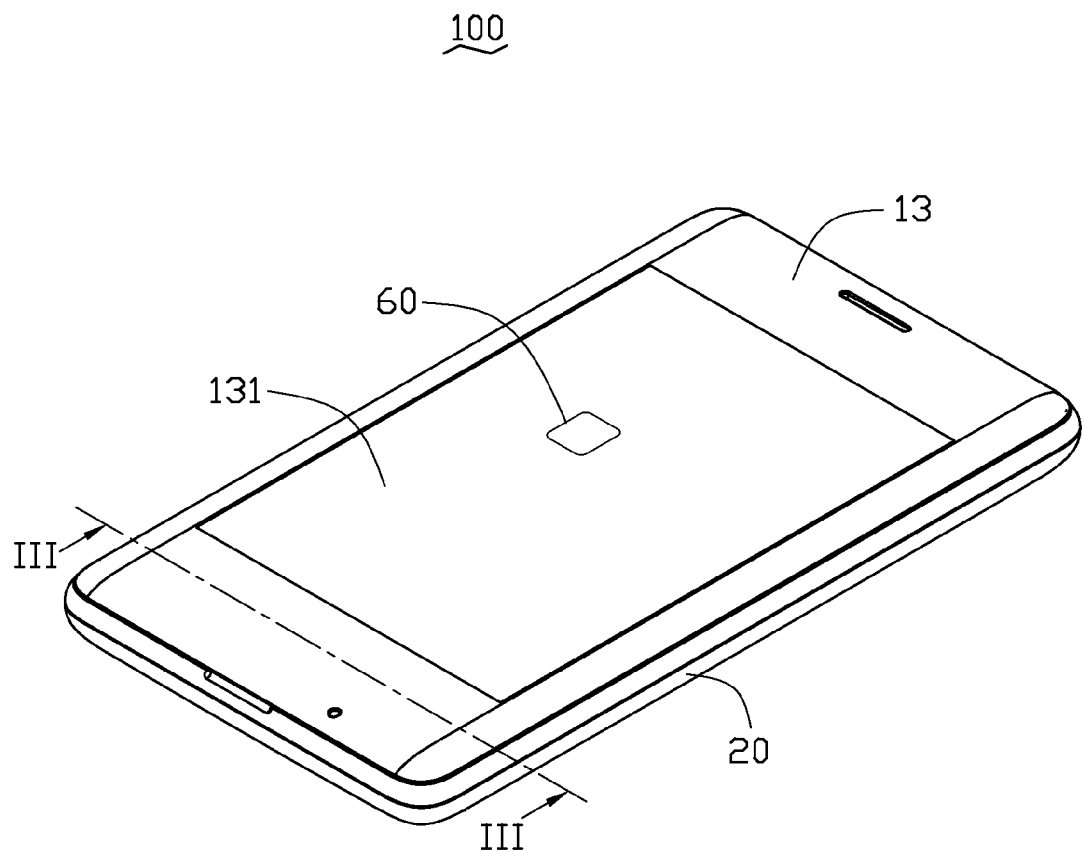
FIG. 2 shows an isometric view of the electronic device of FIG. 1.

FIG. 1 illustrates an exploded view of a first exemplary embodiment of an electronic device 100 including a main body 10, a back cover 20, a printed circuit board (PCB) 30, and a switch structure (not labeled). FIG. 2 shows an isometric view of the electronic device 100 of FIG. 1. The switch structure includes a power circuit 33, which serves as a power element, at least one first magnetic component 40, at least one second magnetic component 50, and a keypad 60 (shown in FIG. 2). In one exemplary embodiment, the switch structure includes two first magnetic components 40, and two second magnetic components 50.

The main body 10 includes a housing 11 and a front cover 13. The housing 11 includes a bottom wall 111, and a peripheral wall 113 protruding around the bottom wall 111. The bottom wall 111 and the peripheral wall 113 cooperatively define a receiving groove 115.

The front cover 13 is mounted to a top portion of the peripheral wall 113 of the housing 11 and covers the receiving groove 115. The front cover 13 includes a touch screen 131 on a surface thereof for receiving touch signals.

The PCB 30 is received in the receiving groove 115. In this exemplary embodiment, the electronic device 100 further includes a plurality of screws 70 for fixing the PCB 30 in the housing 11. In particular, the housing 11 includes a plurality of mounting poles 1111 protruding from the bottom wall 111. Each mounting pole 1111 defines a screw hole 1113. The PCB 30 defines a plurality of mounting holes 31 corresponding to the screws 70. Each screw 70 passes through a corresponding mounting hole 31, and screws into a corresponding screw hole 1113, such that the PCB 30 is fixed in the receiving groove 115.

The back cover 20 is detachably mounted to the housing 11 of the main body 10. In one exemplary embodiment, the back cover 20 is a battery cover. A surface of the housing 11 opposite to the front cover 13 defines a compartment (not labeled) for accommodating a battery. The back cover 20 is attached to the housing 11 to shield the battery. In another exemplary embodiment, the back cover 20 can be a protective cover for closing an entrance of a connector or a memory card.

In one exemplary embodiment, the first magnetic components 40 are electromagnets, and the second magnetic components 50 are permanent magnets. The first magnetic component 40 includes an iron core 41 and a solenoid coil 43 wrapped around the iron core 41. The coil 43 is electrically connected to the power circuit 33 of the PCB 30 by traces (not shown).

Figure 3:
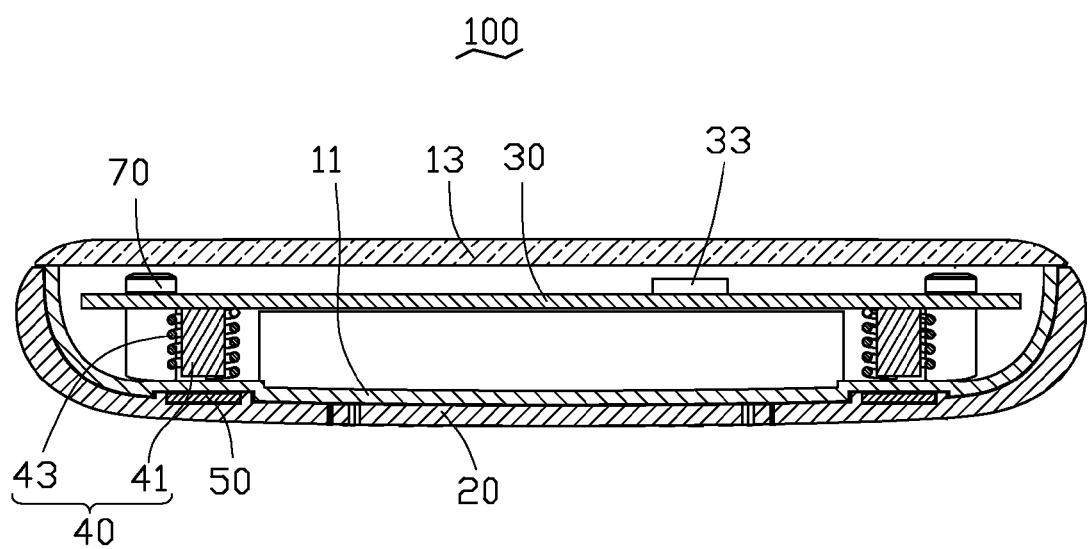
FIG. 3 shows an enlarged, cross-sectional view of the electronic device of FIG. 2 taken along line III-III.

FIG. 3 illustrates an enlarged, cross-sectional view of the electronic device 100. In the exemplary embodiment, the first magnetic components 40 are mounted to the main body 10 by soldering the iron core 41 and the coil 43 to the PCB 30. The second magnetic components 50 are mounted to the back cover 20. An inner surface of the back cover 20 defines a mounting groove 23. The second magnetic components 50 are received in the mounting groove 23, and aligned with corresponding distal ends of the iron cores 41 of the first magnetic components 40. Thus, when the back cover 20 is attached to the main body 10, the first magnetic components 40 are positioned at a first side of the bottom wall 111 of the housing 11, and the second magnetic components 50 are positioned at a second side of the bottom wall 111 opposite to the first side.

The keypad 60 is electronically connected to the PCB 30. In one exemplary embodiment, the keypad 60 can be a physical keypad, or a virtual keypad on the touch screen 131. In the exemplary embodiment, the keypad 60 is a virtual keypad on the touch screen 131 of the front cover 13.

Figure 4:
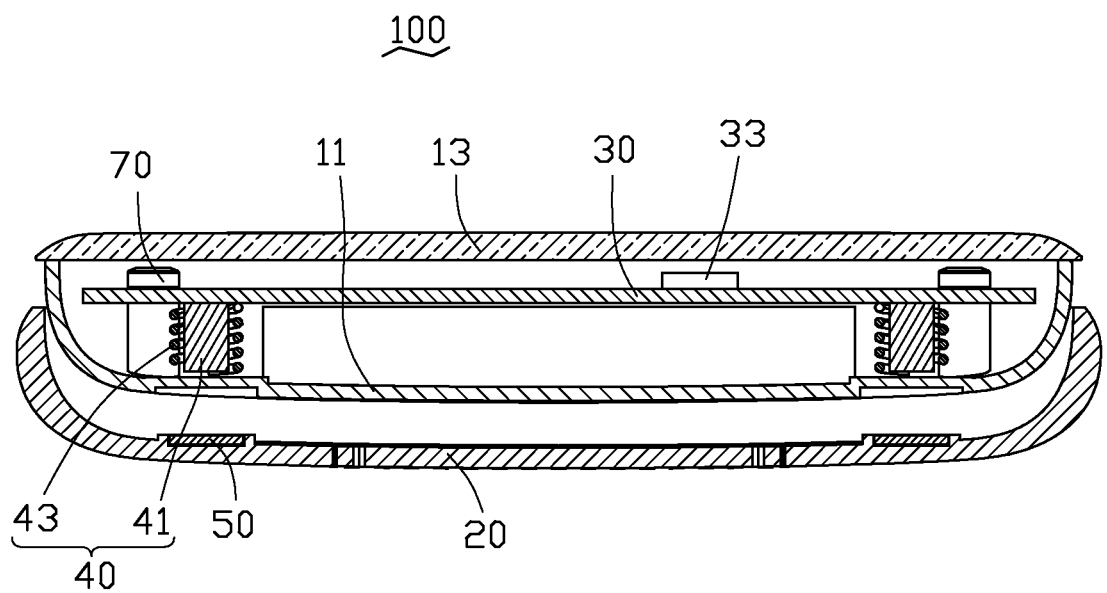
FIG. 4 is similar to FIG. 3, but showing the electronic device in another configuration.

Referring to FIG. 4, if the keypad 60 is deactivated by a user, there is no current flowing through the coil 43. Because the second magnetic components 50 are positioned adjacent to the iron cores 41 of the first magnetic components 40, a magnetic attractive force is generated between the iron cores 41 and the second magnetic components 50, such that the back cover 20 is tightly adhered to the main body 20 to shield the battery 20. To remove the back cover 20 from the main body 10, the keypad 60 is activated by a user, and a signal is transmitted to the PCB 30. The PCB 30 controls the power circuit 33 to output a current to the coil 43, thereby magnetizing the iron core 41. A polarity of an end of the first magnetic components 40 adjacent to the second magnetic components 50 is the same as a polarity of an end of the second magnetic components 50 adjacent to the first magnetic components 40. Thus, a repulsive force is generated between the second magnetic components 50 and the first magnetic components 40. The repulsive force pushes the back cover 20 away from the main body 10, so that the back cover 20 can be removed from the main body 10 easily.

In the exemplary embodiment, for increasing a stability of engagement between the main body 10 and the back cover 20, the housing 11 defines a plurality of latching grooves 117, and the back cover 20 includes a plurality of latching blocks 21. Each latching block 21 is detachably received into a corresponding latching groove 117. In another exemplary embodiment, the housing 11 can include the latching blocks 21, and the back cover 20 can define the latching grooves 117.

Figure 5:
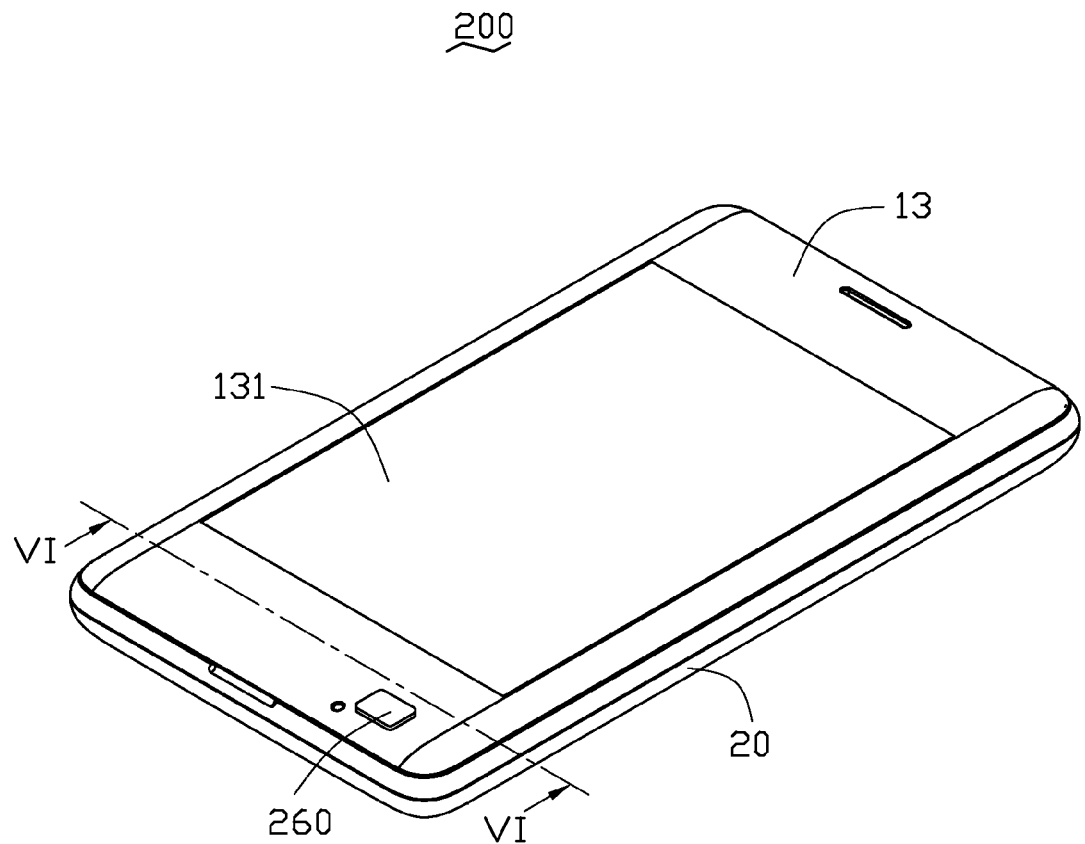
FIG. 5 shows an isometric view of a second exemplary embodiment of the electronic device.
Figure 6:
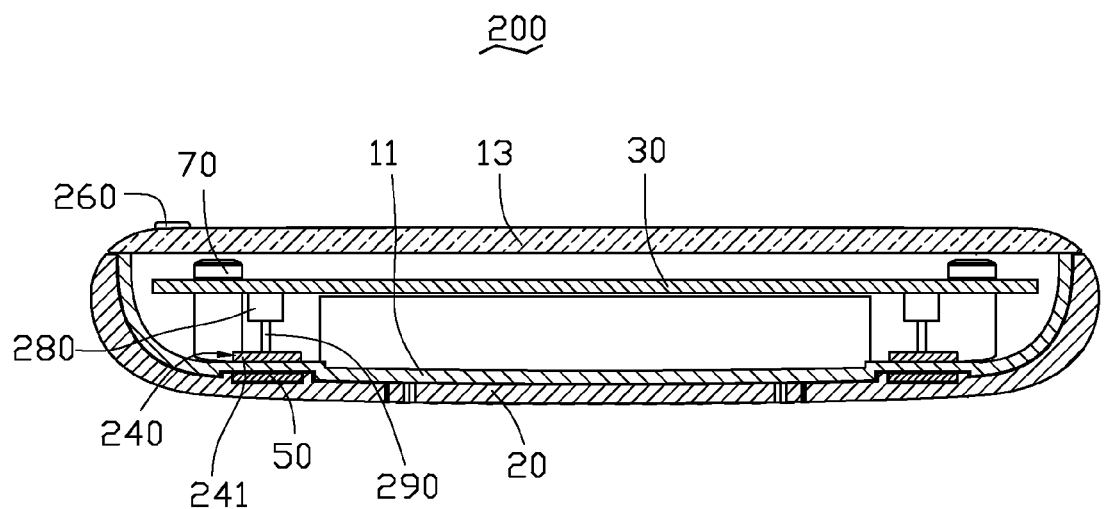
FIG. 6 shows an enlarged, cross-sectional view of the electronic device of FIG. 5 taken along line VI-VI.
Figure 7:
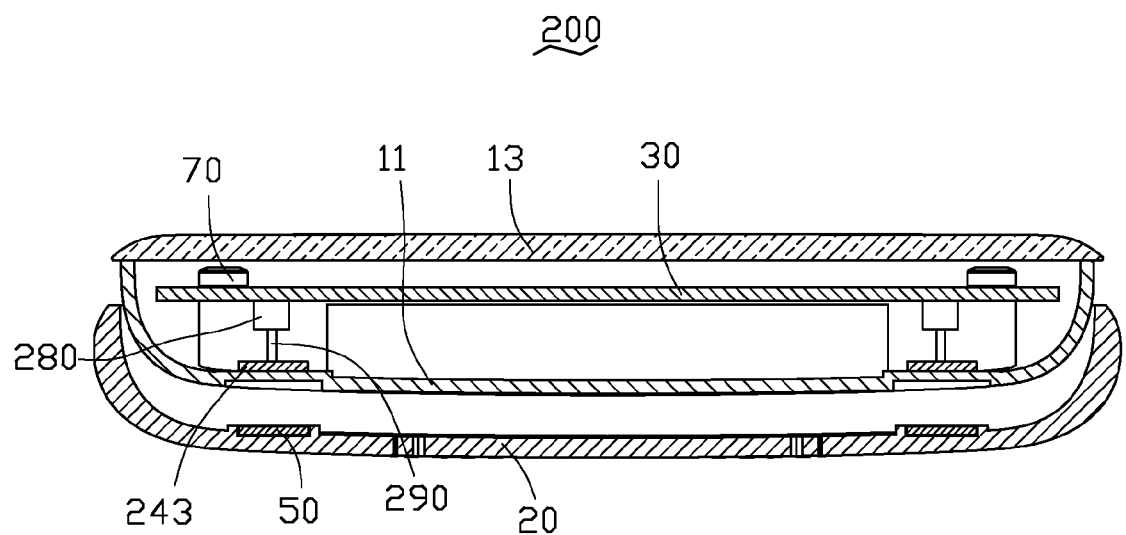
FIG. 7 is similar to FIG. 6, but showing the electronic device in another configuration.

FIG. 5 illustrates a second exemplary embodiment of an electronic device 200. FIG. 6 illustrates an enlarged, cross-sectional view of the electronic device 200 of FIG. 5. FIG. 7 is similar to FIG. 6. Same components in the electronic device 100 and the electronic device 200 have the same designated numerals. The electronic device 200 differs from the electronic device 100 in that a first magnetic component 240 of the electronic device 200 is a bar magnet. The first magnetic component 240 includes a first end 241 (shown in FIG. 6) and an opposite second end 243 (shown in FIG. 7). The first end 241 is mounted to the main body 10 and faces the second magnetic component 50. A polarity of the first end 241 is opposite to a polarity of the second end 243. Thus, a magnetic attractive force can be generated between the first end 241 and the second magnetic component 50, and a magnetic repulsive force can be generated between the second end 243 and the second magnetic component 50. In this exemplary embodiment, the keypad 260 is a physical keypad on a top surface of the front cover 13. The electronic device 200 further includes a motor 280 and a connecting rod 290. The motor 280 serves as the power element. The motor 280 is mounted to the PCB 30 and electronically connected to the keypad 260. The connecting rod 290 is fixed to a substantially middle portion of the first magnetic component 240. The motor 280 drives the connecting rod 290 to rotate, and the first magnetic component 240 rotates with the rod 290, such that either the first end 241 or the second end 243 is aligned with the second magnetic component 50.

In use, when the back cover 20 is attached to the main body 10, the first end 241 is aligned with the second magnetic component 50, and the magnetic attractive force generated between the first end 241 and the second magnetic component 50 facilitates the engagement between the back cover 20 and the main body 10. When the keypad 260 is pressed to be activated, the keypad 260 sends a signal to the motor 280, and the motor 280 drives the connecting rod 190 to rotate the first magnetic component 240 substantially 180 degrees, to allow the second end 243 to align with the second magnetic component 50. The magnetic repulsive force generated between the second end 243 and the second magnetic component 50 pushes the back cover 20 away from the main body 10, thus detaching the back cover 20 from the main body 10.

It is believed that the exemplary embodiments and their advantages will be understood from the foregoing description, and it will be apparent that various changes may be made thereto without departing from the spirit and scope of the disclosure or sacrificing all of its material advantages, the examples hereinbefore described merely being preferred or exemplary embodiments of the disclosure.

What is claimed is:

1. A switch structure, comprising:
   a power element;
   a keypad;
   a first magnetic component; and
   a second magnetic component positioned adjacent to the first magnetic component;
   wherein when the keypad is deactivated, a magnetic attractive force is generated between the first magnetic component and the second magnetic component; when the keypad is activated, the power element controls the first magnetic component to generate a magnetic repulsive force with the second magnetic component;
   wherein the power element is a motor, the first magnetic component is a bar magnet comprising a first end and a opposite second end having a polarity opposite to a polarity of the first end; when the keypad is activated, the motor controls the first magnetic component to rotate to align either the first end or the second end with the second magnetic component.

2. The switch structure of claim 1, wherein one of the first magnetic component and the second magnetic component is mounted on a cover of an electronic device, the other one of the first magnetic component and the second magnetic component is mounted on a main body of the electronic device, the magnetic repulsive force generated between the first magnetic component and the second magnetic component drives the cover to be away from the main body.

3. The switch structure of claim 1, wherein the first magnetic component is an electromagnet, the second magnetic component is a permanent magnet.

4. The switch structure of claim 3, further comprising a printed circuit board (PCB), wherein the PCB comprises a power circuit serves as the power element, the first magnetic component comprises a iron core and a coil wrapped around the iron core, the coil is electronically connected to the power circuit; the power circuit outputs a current to the coil when the keypad is activated thereby magnetizing the iron core.

5. The switch structure of claim 4, wherein the keypad is one of a physical keypad and a virtual keypad on a touch screen.

6. An electronic device, comprising:
   a main body;
   a cover detachably mounted to the main body; and
   a switch structure, the switch structure comprising:
      a power element;
      a keypad;
      a first magnetic component mounted to one of the main body and the cover; and
      a second magnetic component mounted to the other one of the main body and the cover;
   wherein when the keypad is deactivated, a magnetic attractive force is generated between the first magnetic component and the second magnetic component; when the keypad is activated, the power element controls the first magnetic component to generate a magnetic repulsive force with the second magnetic component, the magnetic repulsive force drives the cover to be away from the main body;
   wherein the power element is a motor, the first magnetic component is a bar magnet comprising a first end and a opposite second end having a polarity opposite to a polarity of the first end; when the keypad is activated, the motor controls the first magnetic component to rotate to align one of the first end and the second end with the second magnetic component.

7. The electronic device of claim 6, wherein one of the main body and the cover defines at least one latching groove, the other one the main body and the cover protrudes at least one latching block, the latching block is latched in the latching groove.

8. The electronic device of claim 6, wherein the first magnetic component is an electromagnet, the second magnetic component is a permanent magnet.

9. The electronic device of claim 8, wherein the switch structure further comprises a printed circuit board (PCB), the PCB comprises a power circuit serves as the power element, the first magnetic component comprises a iron core and a coil wrapped around the iron core, the coil is electronically connected to the power circuit; the power circuit outputs a current to the coil when the keypad is activated thereby magnetizing the iron core.

10. The electronic device of claim 9, wherein the second magnetic component is mounted on the cover and aligns with the iron core, when the keypad is deactivated, a magnetic attractive force is generated between the iron core and the second magnetic component.

11. The electronic device of claim 9, wherein the keypad is one of a physical keypad and a virtual keypad on a touch screen.

12. An electronic device, comprising:
a main body;
a cover detachably mounted to the main body; and
a switch structure, the switch structure comprising:
    a power element;
    a keypad;
    a first magnetic component mounted to one of the main body and the cover; and
    a second magnetic component mounted to the other one of the main body and the cover;
wherein when the keypad is activated, the power element controls the first magnetic component to generate a magnetic repulsive force with the second magnetic component, the magnetic repulsive force drives the cover to be away from the main body;
wherein the power element is a motor, the first magnetic component is a bar magnet comprising a first end and an opposite second end having a polarity opposite to a polarity of the first end; when the keypad is activated, the motor controls the first magnetic component to rotate to align with one of the first end and the second end of the second magnetic component.

13. The electronic device of claim 12, wherein the first magnetic component is an electromagnet, the second magnetic component is a permanent magnet.

14. The electronic device of claim 13, wherein the switch structure further comprises a printed circuit board (PCB), the PCB comprises a power circuit serves as the power element.

15. The electronic device of claim 12, wherein the keypad is one of a physical keypad and a virtual keypad displayed on a touch screen.

16. The electronic device of claim 12, wherein one of the main body and the cover defines at least one latching groove, the other one the main body and the cover protrudes at least one latching block, the latching block is latched in the latching groove.

* * * * *